(12) United States Patent
Wang (10) Patent No.: US 9,328,834 B2
(45) Date of Patent: May 3, 2016

(54) AIR VALVE CONNECTING DEVICE

(71) Applicant: Beto Engineering & Marketing Co., Ltd., Taichung (TW)

(72) Inventor: Lo Pin Wang, Taichung (TW)

(73) Assignee: Beto Engineering & Marketing Co., Ltd., Beitun, Taichung (TW)

( * ) Notice: Subject to any disclaimer, the term of this patent is extended or adjusted under 35 U.S.C. 154(b) by 106 days.

(21) Appl. No.: 14/265,531

(22) Filed: Apr. 30, 2014

(65) Prior Publication Data

US 2015/0316159 A1 Nov. 5, 2015

(51) Int. Cl.
*F16K 15/20* (2006.01)

(52) U.S. Cl.
CPC .......... *F16K 15/20* (2013.01); *Y10T 137/3724* (2015.04)

(58) Field of Classification Search
CPC ............ F16K 15/20; B60C 29/06; B60S 5/04
USPC .................................. 137/231, 223, 233–234
See application file for complete search history.

(56) References Cited

U.S. PATENT DOCUMENTS

| | | | | |
|---|---|---|---|---|
| 1,868,165 A * | 7/1932 | Hammond | ............... | F16K 15/20 137/223 |
| 5,645,100 A | 7/1997 | Chuang et al. | | |
| 5,683,234 A | 11/1997 | Chuang et al. | | |
| 5,819,781 A * | 10/1998 | Wu | ............. | B60S 5/04 137/223 |
| 6,076,544 A * | 6/2000 | Pierce | ............. | F16L 37/18 137/223 |
| 6,105,601 A * | 8/2000 | Wang | ............. | B60S 5/04 137/231 |
| 6,146,116 A * | 11/2000 | Wu | ............. | F04B 33/005 137/223 |
| 6,289,920 B1 * | 9/2001 | Wang | ............. | B60S 5/04 137/223 |
| 6,328,057 B1 * | 12/2001 | Wang | ............. | F16L 37/18 137/223 |
| 6,378,547 B1 * | 4/2002 | van der Blom | ............. | B60S 5/04 137/223 |
| 7,866,335 B2 | 1/2011 | Wang | | |
| 8,839,809 B1 * | 9/2014 | Wang | ............. | F04B 33/005 137/223 |
| 2002/0074039 A1 * | 6/2002 | Blom | ............. | F16K 15/20 137/223 |
| 2005/0230499 A1 * | 10/2005 | Wang | ............. | B05B 1/1618 239/390 |
| 2005/0263185 A1 * | 12/2005 | Chen | ............. | F16K 15/20 137/231 |
| 2007/0235677 A1 * | 10/2007 | Wang | ............. | F04B 33/005 251/205 |
| 2007/0246680 A1 * | 10/2007 | Chao | ............. | F16K 15/20 251/340 |
| 2008/0236675 A1 * | 10/2008 | Wang | ............. | F16K 15/20 137/231 |
| 2008/0308158 A1 * | 12/2008 | Wu | ............. | F04B 33/005 137/231 |
| 2009/0229677 A1 * | 9/2009 | Wang | ............. | F04B 33/005 137/231 |
| 2012/0031504 A1 * | 2/2012 | Wu | ............. | F04B 33/005 137/231 |
| 2013/0126771 A1 * | 5/2013 | Wang | ............. | F04B 33/00 251/321 |
| 2014/0190576 A1 * | 7/2014 | Wang | ............. | F16K 15/20 137/231 |
| 2014/0261754 A1 * | 9/2014 | Wang | ............. | F04B 33/005 137/231 |
| 2015/0053280 A1 * | 2/2015 | Wang | ............. | F16L 37/28 137/231 |

\* cited by examiner

*Primary Examiner* — Craig Schneider
*Assistant Examiner* — Daniel P Donegan
(74) *Attorney, Agent, or Firm* — Charles E. Baxley (57) ABSTRACT

An air valve connecting device or attachment includes a housing having a tilted inner peripheral surface, a sliding member slidably engaged in the housing and having a pathway for receiving a pressurized air, a gripping device having two casing members slidably engaged with the tilted inner peripheral surface of the housing and having a passage formed in the casing members, and an inflation valve engageable into the passage of the casing members for moving the casing members into the housing and for allowing the casing members to be forced toward each other with the tilted inner peripheral surface of the housing and in order to grasp the inflation valve with the casing members.

14 Claims, 6 Drawing Sheets

AIR VALVE CONNECTING DEVICE

BACKGROUND OF THE INVENTION

1. Field of the Invention

The present invention relates to an air valve connecting head or device or attachment, and more particularly to an air valve connecting device or attachment including an improved structure for easily and quickly connecting to an inflation valve by the user and for preventing an air leaking from the inflation valve and the attachment, and for allowing the air valve connecting device to be easily operated or actuated with only one single hand of the user without additional tools.

2. Description of the Prior Art

Typical air valve connecting devices or attachments comprise one or more fitting ports or mouths formed or provided in a valve housing for receiving or engaging with inflation valves or nozzles and for selectively inflating various kinds of balls, inner tires of the bicycles or the motorcycles or the vehicles, or other inflatable articles.

For example, U.S. Pat. No. 5,683,234 to Chuang et al., and U.S. Pat. No. 5,645,100 to Chuang et al. disclose two of the typical hand operated, dual chambered, pneumatic pumps comprising a fitting member or attachment for selectively or alternatively engaging with different nozzles or tire valves, such as the U.S. type inflation valve or the French type inflation valve, or the like.

However, the typical air valve connecting heads or fittings comprise a structure that may occupy a great space or volume and that may not be easily operated or may not effectively grasping or holding the different inflation valves, and may have an air leaking problem occurred through either the inflation valve or the attachment.

U.S. Pat. No. 7,866,335 to Wang discloses another typical air valve connecting heads for the hand-held air pump and comprising a fitting device or attachment for selectively or alternatively engaging with different tire valves, such as the U.S. type inflation valve or the French type inflation valve, or the like.

However, the typical air valve connecting heads or attachments also comprise a structure that may not be easily operated by the user or may not effectively grasping or holding the different inflation valves, and may have an air leaking problem occurred through either the inflation valve or the attachment.

The present invention has arisen to mitigate and/or obviate the afore-described disadvantages of the conventional air valve connecting devices or attachments.

SUMMARY OF THE INVENTION

The primary objective of the present invention is to provide an air valve connecting device or attachment including an improved structure for easily and quickly connecting to an inflation valve by the user and for preventing an air leaking from the inflation valves and the attachment, and for allowing the air valve connecting device to be easily operated or actuated with only one single hand of the user without additional tools.

In accordance with one aspect of the invention, there is provided an air valve connecting device comprising a housing including a compartment formed therein, and including an entrance formed therein and communicating with the compartment of the housing for receiving a pressurized air, and including a tilted inner peripheral surface formed in a lower portion of the housing, a sliding member slidably received and engaged in the compartment of the housing, and including a pathway formed therein and communicating with the entrance of the housing for receiving the pressurized air from the entrance of the housing, the sliding member including a lower portion, a gripping device including a casing having two casing members slidably engaged with the tilted inner peripheral surface in the lower portion of the housing, the casing including a passage formed in the casing members, and an inflation valve engageable into the passage of the casing members of the casing for selectively moving the casing into the compartment of the housing and for allowing the casing members of the casing to be forced toward each other with the tilted inner peripheral surface of the housing, and for allowing the air valve connecting device to be easily operated or actuated with only one single hand of the user without additional tools.

The gripping device includes a shaft extended from one of the casing members and pivotally engaged with the other casing member for pivotally coupling the casing members of the casing together. The gripping device includes a depression formed in other casing member for pivotally receiving and position and engaging with the shaft.

A latch device may further be provided and includes a first end portion pivotally attached to the housing with a pivot pin, and includes a detent for engaging with the casing and for anchoring and securing the casing to the housing and for retaining the inflation valve in the casing members of the casing. One of the casing members includes a depression or notch formed therein for selectively engaging with the detent of the latch device and for positioning the casing to the housing.

The housing includes a handle extended therefrom for receiving the pressurized air from a pressurized air reservoir. The handle includes a first retaining member extended from the handle, and the latch device includes a second retaining member provided therein for engaging with the first retaining member of the handle and for anchoring the detent in engagement with the casing.

For example, the first retaining member of the handle is selected from a tongue extended from the handle, and the second retaining member of the latch device is selected from an aperture formed in the latch device for engaging with the tongue of the handle. The casing members of the casing each include a resilient outer peripheral wall for increasing a resilience of the casing members of the casing.

The sliding member includes a tube provided in the lower portion of the sliding member and engaged into the passage of the casing for anchoring the casing to the sliding member. A sealing ring is engaged between the tube of the sliding member and the casing.

The housing includes a spring biasing member disposed in the compartment of the housing and engaged between the sliding member and the housing for biasing and moving the sliding member and the casing members of the casing toward the lower portion of the housing.

The housing includes a plate or panel or positioning device engaged into the lower portion of the compartment of the housing and engageable with the casing members of the casing for preventing the casing from being disengaged from the housing inadvertently.

The housing includes a channel formed in the lower portion of the housing and communicating with the compartment of the housing for engaging with the positioning device. The positioning device includes an orifice formed therein and communicating with the compartment of the housing for receiving and engaging with the inflation valve.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-8, an air valve connecting device or attachment in accordance with the present invention comprises a head body or outer housing 10 including a compartment 11 formed therein and having an enclosed or blocked upper portion 12 of the housing 10 and opened downwardly through a lower or bottom portion 13 of the housing 10 (FIGS. 3-8), the housing 10 includes a stud or extension or inlet barrel or handle 14 extended laterally and outwardly therefrom for connecting or coupling to a pressurized air reservoir or hand-held air pump (not illustrated) or the like with such as hoses (not illustrated) and/or a control ferrule 15 or the like for receiving the pressurized air from the air reservoir or hand-held air pump (not illustrated) or the like, and includes a lateral orifice or entrance 16 formed therein, such as formed in or through the handle 14 of the housing 10 and communicating with the compartment 11 of the housing 10 for guiding the pressurized air to flow into the compartment 11 of the housing 10.

The above-described structure or configuration for the connection mechanism or status between the handle 14 and the air reservoir or hand-held air pump (not illustrated) is typical and is not related to the present invention and will not be described in further details. The housing 10 further includes a track or trail or channel 17 formed or provided in the lower portion 13 of the housing 10 and communicating with the compartment 11 of the housing 10 for slidably receiving or engaging with a positioning or retaining or anchoring portion or device or member 20 which is extended or engaged into the lower portion 13 of the compartment 11 of the housing 10 and which includes a bore or opening or orifice 21 formed therein and communicating with the compartment 11 of the housing 10, and the housing 10 further includes a bore or orifice or opening 18 formed therein (FIGS. 7, 8) and disposed or formed or located below the handle 14 and communicating with the compartment 11 of the housing 10.

The housing 10 further includes a latch pin or member or pivot pin 19 engaged into the housing 10 and disposed or located beside or close to the opening 18 of the housing 10, or extended through the opening 18 of the housing 10, and further includes a tilted or inclined inner peripheral portion or surface 22 formed or provided in the lower portion 13 of the housing 10, and the inner peripheral surface 22 and/or the lower portion 13 of the compartment 11 of the housing 10 includes a non-circular cross section (FIG. 7), such as a square or rectangular cross section. The housing 10 further includes a positioning or retaining or anchoring portion or device or member 23, such as a hook or latch element or catch or latch member or tongue 23 extended or provided in the lower portion of the handle 14. The air valve connecting device or attachment further includes a valve piece or shank or sliding member 30 slidably or movably disposed or engaged into the upper portion 12 of the compartment 11 of the housing 10 and movable up and down along the compartment 11 of the housing 10.

The sliding member 30 includes a passage or orifice or opening or conduit or pathway 31 laterally formed in the middle or intermediate portion of the sliding member 30 for selectively aligning with or engaging with or communicating with the entrance 16 of the handle 14 or of the housing 10, best shown in FIGS. 3-6 and 10-11, and for selectively receiving the pressurized air from the air reservoir or hand-held air pump (not illustrated) or the like; and includes an opening or mouth 32 formed therein, such as formed in the lower portion 33 of the sliding member 30 and communicating with the pathway 31 of the sliding member 30 for allowing the pressurized air to selectively flow from the pathway 31 to the mouth 32 of the sliding member 30 (FIGS. 3-6) and then to flow out of the sliding member 30 selectively; and includes a relatively decreased or reduced ring or conduit or cylindrical member or tube 34 formed or provided in the lower portion 33 of the sliding member 30. The mouth 32 is formed through the lower portion 33 and the tube 34 of the sliding member 30 for receiving or engaging with an inflation valve 90 (FIGS. 3, 5-6), such as the U.S. type valve or the French type or first inflation valve 90 or the like.

Figure 4:
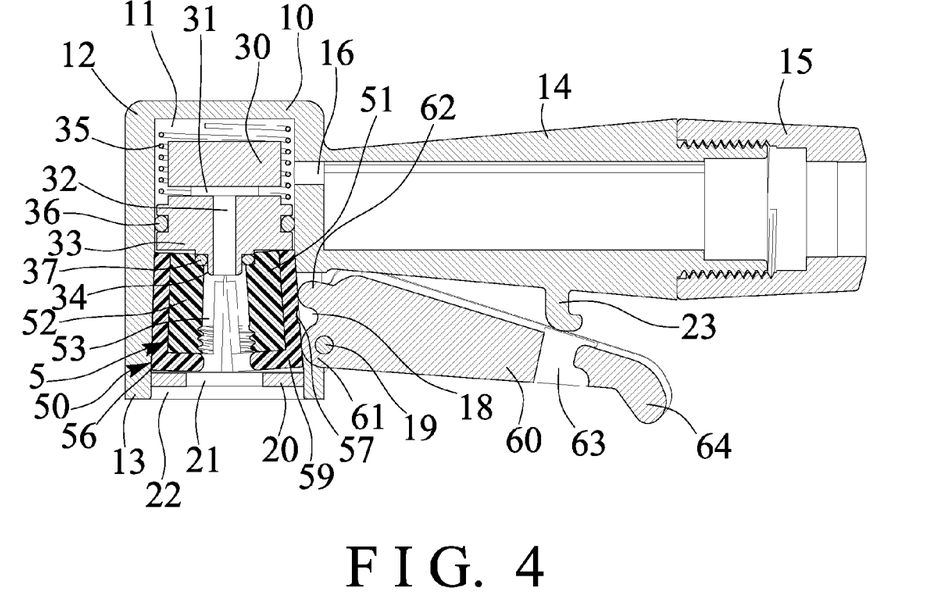
FIG. 4 is a cross sectional view of the air valve connecting device or attachment taken along lines 4-4 of FIG. 2.

The inflation valve 90 may be engaged through the orifice 21 of the positioning device 20 and then engaged into the passage 53 of the casing members 51, 52 of the casing 50. A spring biasing member 35 is disposed or engaged between the sliding member 30 and the housing 10 for biasing and forcing or moving the sliding member 30 downwardly toward the lower portion 13 of the housing 10 (FIG. 4). The air valve connecting device or attachment further includes one or more (such as two) sealing rings 36, 37 attached or mounted or secured or engaged onto the sliding member 30, and contacted or engaged between the sliding member 30 and the housing 10 for selectively making a water or air tight seal between the sliding member 30 and the housing 10, for example, one of the sealing rings 36 is disposed or located below the pathway 31 of the sliding member 30 and attached or engaged onto the sliding member 30, and another sealing ring 37 is disposed or located or engaged onto or around the tube 34 of the sliding member 30.

An anchoring or retaining or chuck or grasping or catching or gripping element or device 5 is slidably or movably disposed or engaged in the lower portion 13 of the compartment 11 of the housing 10 for gripping or grasping or holding or retaining the inflation valve 90 to the sliding member 30 and the housing 10. The gripping device 5 includes another sliding member or casing 50 slidably received or engaged in the lower portion 13 of the compartment 11 of the housing 10 and having two casing members 51, 52, or formed by two casing members 51, 52, and the casing 50 includes a non-circular cross section (FIG. 1), such as a square or rectangular cross section for slidably engaging with the corresponding non-circular tilted inner peripheral surface 22 in the lower portion 13 of the compartment 11 of the housing 10, and includes an opening or orifice or aperture or passage 53 formed in the casing members 51, 52 for partially receiving or engaging with the tube 34 of the sliding member 30 (FIGS. 3-6) and for anchoring or securing or retaining or positioning the casing 50 to the sliding member 30 and the housing 10. The sealing ring 37 is engaged between the tube 34 of the sliding member 30 and the casing members 51, 52 of the casing 50.

Figure 1:
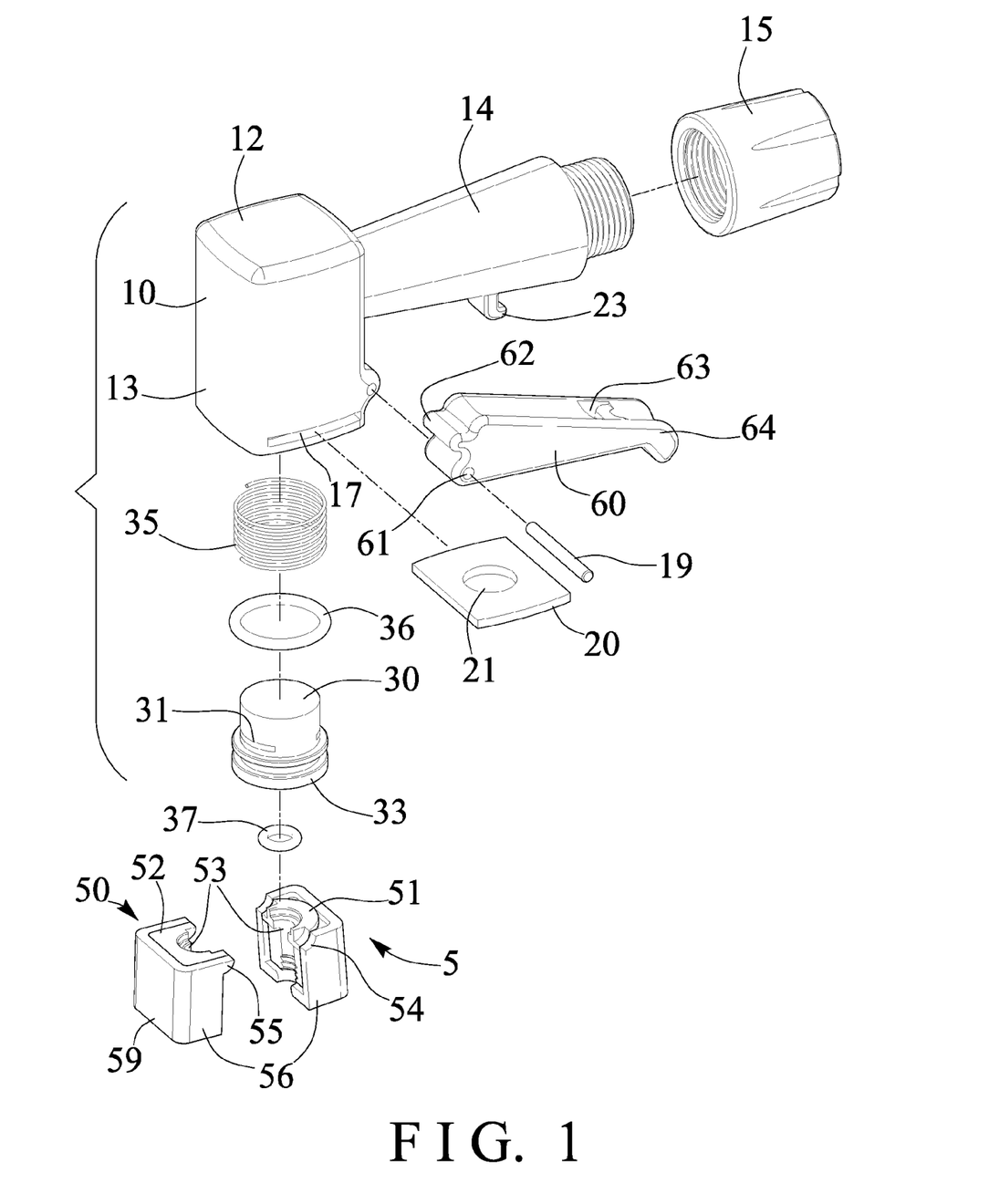
FIG. 1 is an exploded view of an air valve connecting device or attachment in accordance with the present invention.
Figure 2:
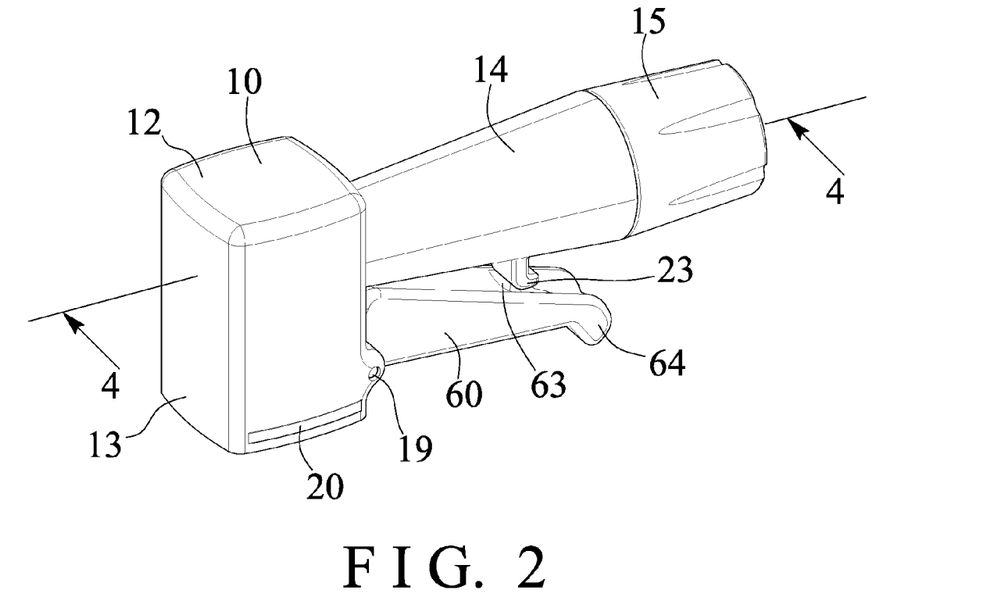
FIG. 2 is a perspective view of the air valve connecting device or attachment.
Figure 3:
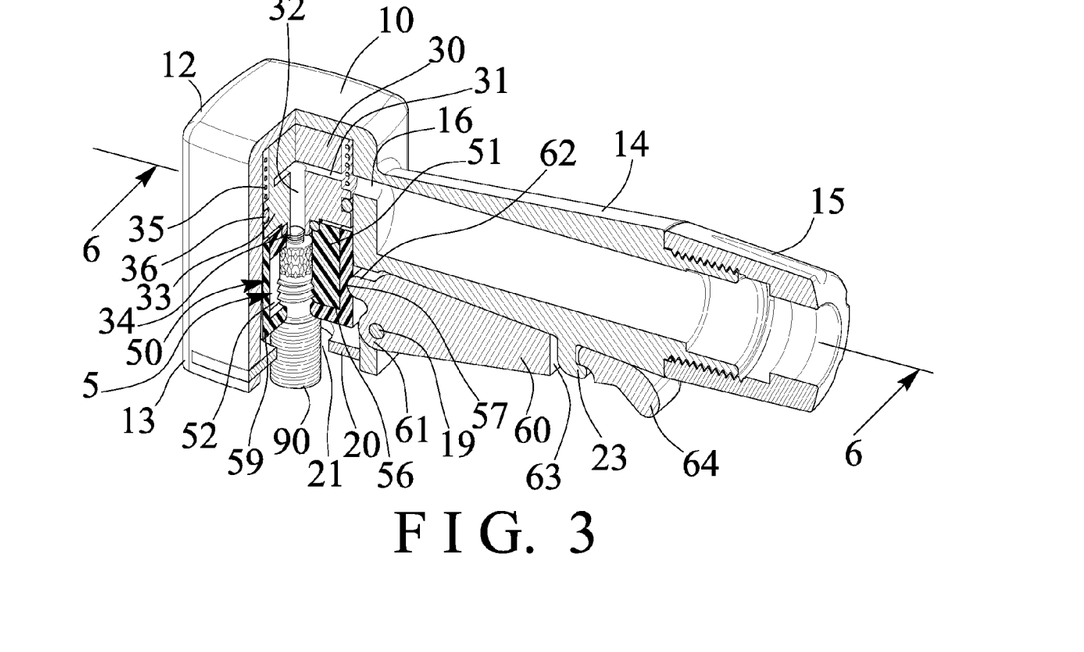
FIG. 3 is another perspective view of the air valve connecting device or attachment similar to FIG. 2, in which a portion of the attachment has been cut off for showing the inner structure of the attachment.
Figure 5:
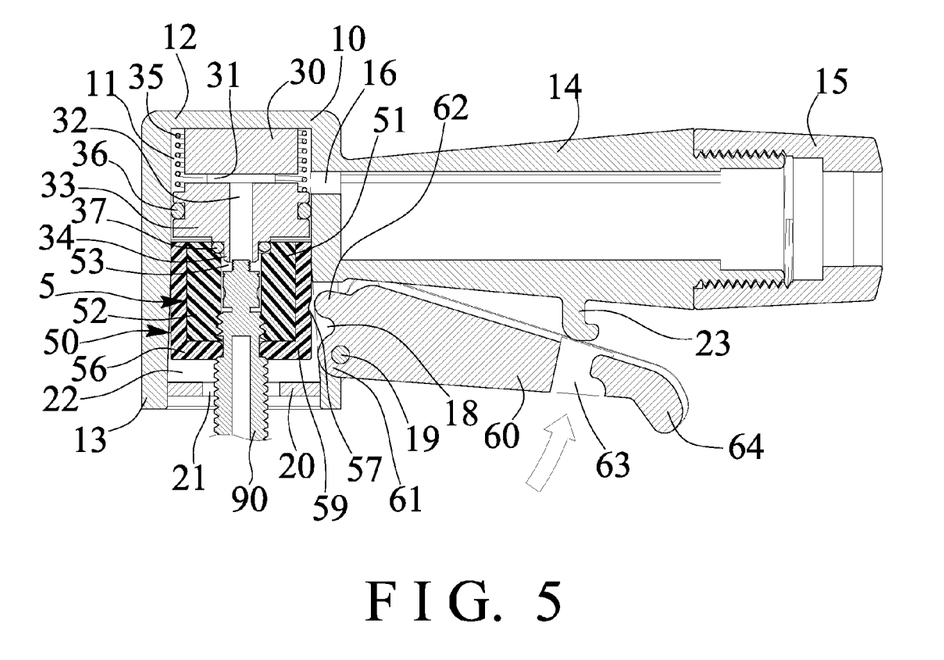
FIG. 5 is another cross sectional view similar to FIG. 4, illustrating the operation of the air valve connecting device or attachment.
Figure 6:
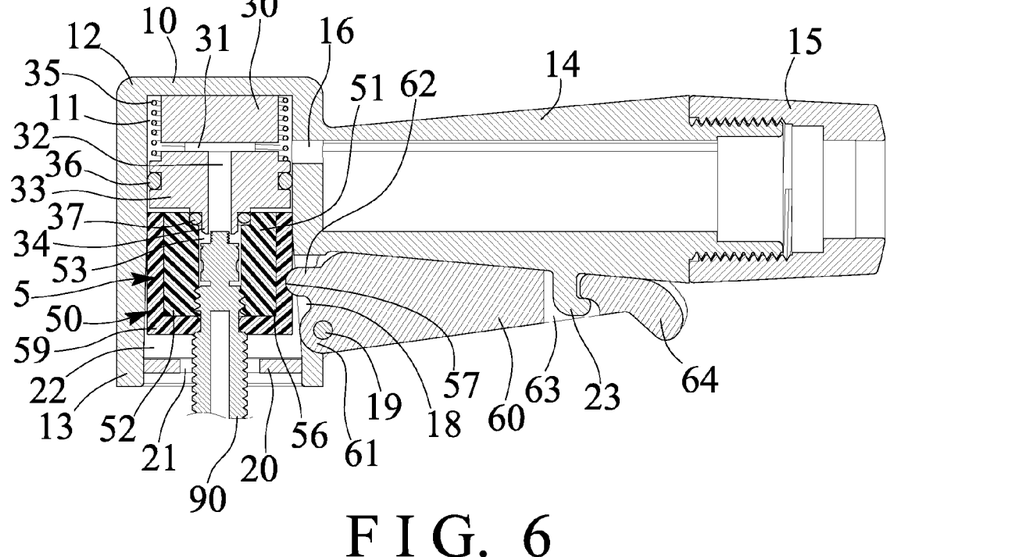
FIG. 6 is a further cross sectional view similar to FIGS. 4 and 5, taken along lines 6-6 of FIG. 3, illustrating the operation of the air valve connecting device or attachment.
Figure 7:
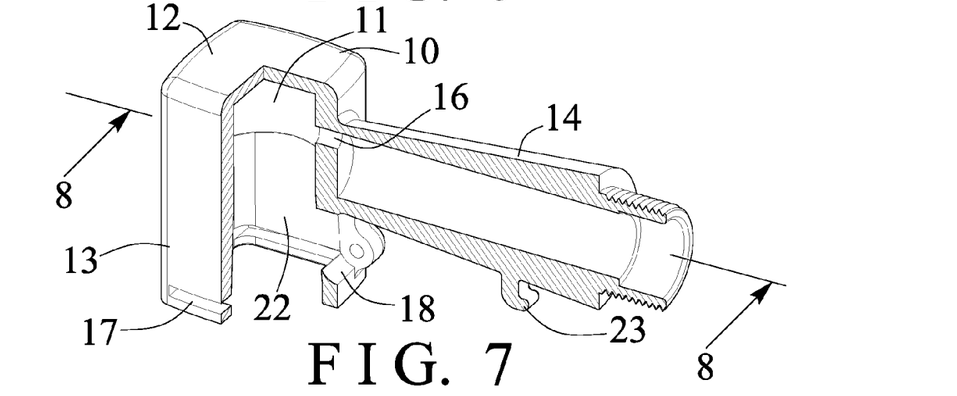
FIG. 7 is a further perspective view, illustrating the outer housing of the air valve connecting device or attachment, in which a portion of the outer housing has been cut off for showing the inner structure of the outer housing.
Figure 8:
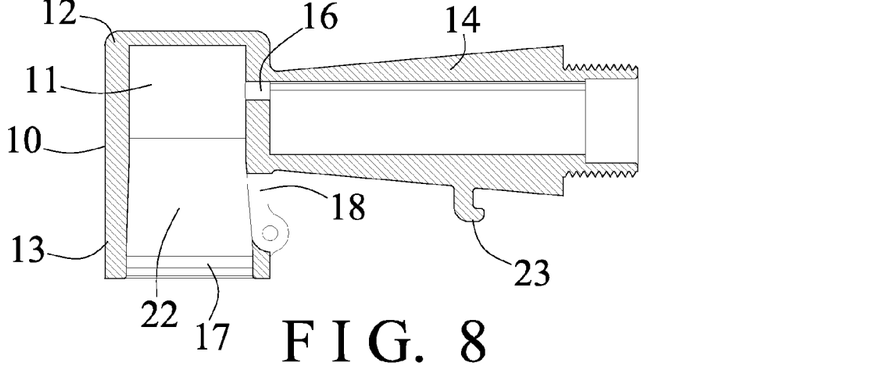
FIG. 8 is a further cross sectional view of the air valve connecting device or attachment taken along lines 8-8 of FIG. 7.

One of the casing members 51 includes a notch or recess or depression 54 formed in the upper portion thereof (FIG. 1), and the other casing member 52 includes a rod or shaft 55 extended laterally from the upper portion thereof and pivotally or rotatably engaged with the depression 54 of the casing member 51 for pivotally or rotatably anchoring or retaining or securing or coupling the casing members 51, 52 of the casing 50 together, and the casing members 51, 52 of the casing 50 include a lower or bottom portion 56 slightly movable away from each other (FIG. 4) when the casing 50 is moved downwardly relative to the housing 10, for selectively receiving or engaging with the inflation valve 90, or for allowing the inflation valve 90 to be selectively engaged into the passage 53 of the casing members 51, 52 of the casing 50 (FIGS. 3, 5-6). When the inflation valve 90 is engaged into the passage 53 of the casing members 51, 52 of the casing 50, the inflation valve 90 may push and force and move the casing 50 and the sliding member 30 into the housing 10 and onto the spring biasing member 35.

As shown in FIGS. 3 and 5-6, when the casing members 51, 52 of the casing 50 are moved into the housing 10, the tilted inner peripheral surface 22 of the housing 10 may force the lower or bottom portion 56 of the casing members 51, 52 to move toward each other and to grip or grasp or hold or retain the inflation valve 90 to the gripping device 5 and the sliding member 30. One of the casing members 51 further includes a recess or depression or notch 57 formed therein and located or faced or directed toward the opening 18 of the housing 10, and/or communicating with the opening 18 of the housing 10. As shown in FIGS. 1 and 3-6, the casing members 51, 52 of the casing 50 each may include a soft or resilient outer peripheral member or wall 59 for increasing the resilience of the casing members 51, 52 of the casing 50; and/or for allowing the inflation valve 90 to be resiliently gripped or grasped or held or retained in the casing members 51, 52 of the casing 50. The positioning device 20 is contactable or engageable with the casing members 51, 52 of the casing 50 for preventing the casing 50 from being disengaged or removed or separated from the housing 10 inadvertently.

A hand grip or trigger or lock or latch element or catch or latch device 60 is further provided and includes one or first end portion 61 rotatably or pivotally attached or mounted or secured or coupled to the housing 10 with the pivot pin 19 for allowing the latch device 60 to be pivoted or rotated relative to the housing 10, and the latch device 60 includes a cam member or catch or latch member or tongue or detent 62 formed or provided or extended from the one or first end portion 61 or the latch device 60 and extendible into the opening 18 and the compartment 11 of the housing 10 for selectively engaging with the notch 57 of the casing 50 (FIGS. 3, 6) and for anchoring or retaining or securing the inflation valve 90 in the casing members 51, 52 of the casing 50. The latch device 60 further includes another positioning or retaining or anchoring portion or device or member 63, such as a depression or recess or opening or orifice or passage or aperture 63 formed in the other or second end portion 64 of the latch device 60 for selectively engaging with the anchoring member or tongue 23 of the handle 14 or of the housing 10 and for anchoring or retaining or securing the detent 62 in engagement with the notch 57 of the casing 50 (FIGS. 3, 6).

Figure 9:
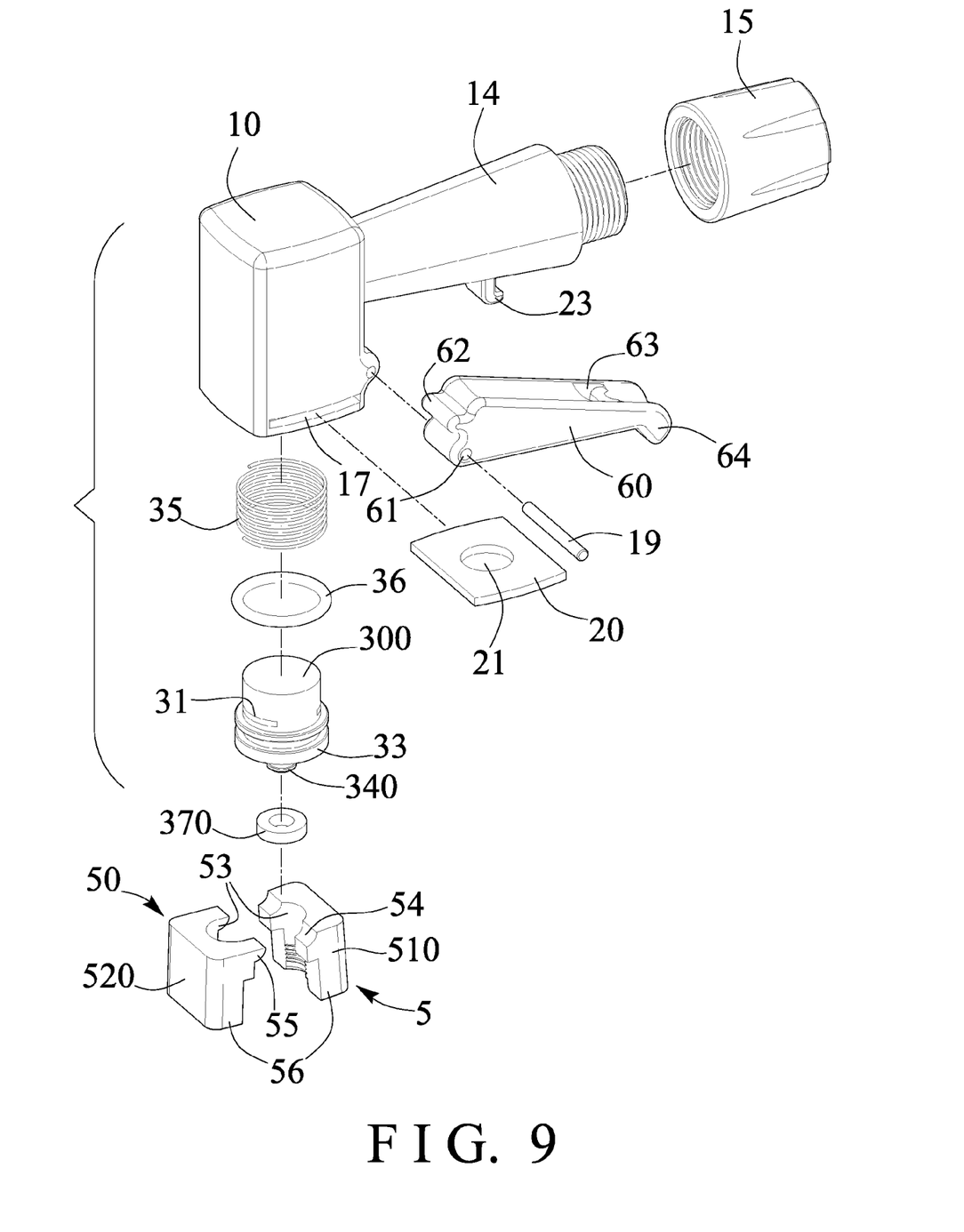
FIG. 9 is another exploded view illustrating the other arrangement of the air valve connecting device or attachment for engaging with the different or other inflation valve.
Figure 10:
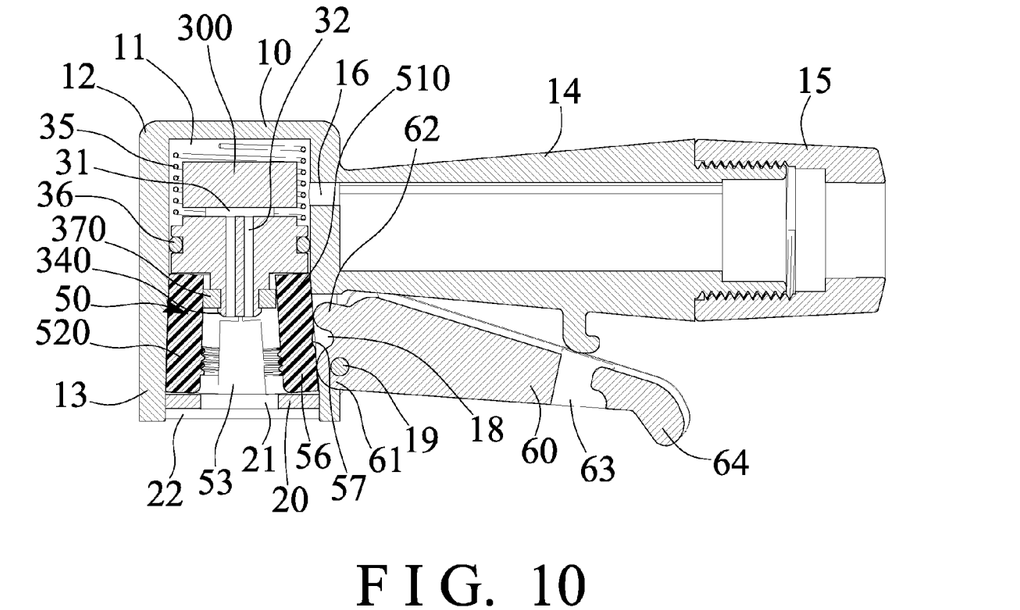
FIGS. 10 and 11 are still further cross sectional views illustrating the operation of the other arrangement of the air valve connecting device or attachment, as shown in FIG. 9, for engaging with the different or other inflation valve.
Figure 11:
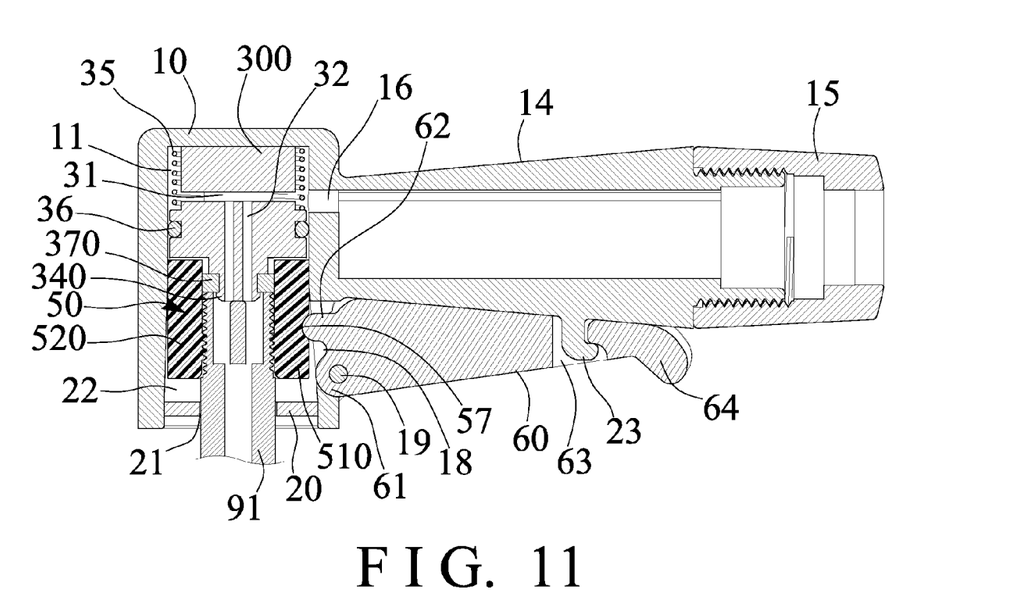

As shown in FIGS. 9-11, for gripping or grasping or holding or retaining the other inflation valve 91 (FIG. 11), such as the French type or the U.S. type valve or second inflation valve 91 or the like, the tube 340 of the sliding member 300 may include a different size or shape from that shown in FIGS. 3-6, for selectively engaging with a different sealing ring 370, and the casing members 510, 520 of the casing 50 may include a different size or shape from that shown in FIGS. 1 and 3-6, for selectively engaging with the different or other inflation valve 91, such as the U.S. type valve or second inflation valve 91. It is to be noted that the air valve connecting device or attachment in accordance with the invention may include a sliding member 30 and a pair of casing members 51, 52 for engaging with the French type inflation valve 90, and may include another sliding member 300 and a pair of casing members 510, 520 for engaging with the different or other or U.S. type inflation valve 91.

In operation, as shown in FIGS. 4 and 10, the spring biasing member 35 may normally bias and force or move the sliding member 30 outwardly and downwardly toward the lower portion 13 of the housing 10, to have the lower or bottom portion 56 of the casing members 51, 52 of the casing 50 to be slightly moved away from each other at the separated position, for allowing the inflation valve 90, 91 to be engaged into the passage 53 of the casing members 51, 52 of the casing 50, the inflation valve 90, 91 may push and force and move the casing 50 and the sliding member 30 into the housing 10 and onto the spring biasing member 35, and may force the casing members 51, 52 of the casing 50 to move toward each other and to grip or grasp or hold or retain the inflation valve 90, 91 to the gripping device 5 and the sliding member 30 (FIGS. 3, 5, 6, 11). After the air pumping operation, the other or second end portion 64 of the latch device 60 may be depressed or forced to move away from the handle 14 in order to disengage or remove or separate the detent 62 from the notch 57 of the casing 50, so as to move the inflation valve 90, 91 out of the housing 10 and the casing 50; or for allowing the inflation valve 90, 91 to be pulled or separated or disengaged from the housing 10 and the casing 50.

It is to be noted that the user may use only one of his hands, or may use only one single hand to hold the housing 10 and to have the inflation valve 90, 91 to be easily and quickly engaged into the passage 53 of the casing members 51, 52 of the casing 50, and may easily and quickly push and force and move the inflation valve 90 and the casing 50 and the sliding member 30 into the housing 10 and onto the spring biasing member 35, and to have the inflation valve 90, 91 to be gripped or grasped or held or retained to or by the casing members 51, 52 of the casing 50 of the gripping device 5 and the sliding member 30.

Accordingly, the air valve connecting device or attachment in accordance with the invention includes an improved structure for easily and quickly connecting an inflation valve by the user and for preventing an air leaking from the inflation valves and the attachment, and includes different sliding members and different casings for engaging with different inflation valves, and for allowing the air valve connecting device to be easily operated or actuated with only one single hand of the user without additional tools.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air valve connecting device comprising:
   a housing including a compartment formed therein, and including an entrance formed therein and communicating with said compartment of said housing for receiving a pressurized air, and including an inner peripheral surface formed in a lower portion of said housing,
   a sliding member slidably received and engaged in said compartment of said housing, and including a pathway formed therein and communicating with said entrance of said housing for receiving the pressurized air from said entrance of said housing, said sliding member including a lower portion,
   a gripping device including a casing having two casing members slidably engaged with said inner peripheral surface in said lower portion of said housing, said casing including a passage formed in said casing members, said gripping device including a shaft extended from one of said casing members and pivotally engaged with the other casing member for pivotally coupling said casing members of said casing together, and
   an inflation valve engageable into said passage of said casing members of said casing for selectively moving said casing into said compartment of said housing and for allowing said casing members of said casing to be forced toward each other with said inner peripheral surface of said housing.

2. The air valve connecting device as claimed in claim 1, wherein said gripping device includes a depression formed in other casing member for engaging with said shaft.

3. The air valve connecting device as claimed in claim 1, wherein a latch device includes a first end portion pivotally attached to said housing with a pivot pin, and includes a detent for engaging with said casing and for anchoring and securing said casing to said housing and for retaining said inflation valve in said casing members of said casing.

4. The air valve connecting device as claimed in claim 3, wherein said housing includes a handle extended therefrom for receiving the pressurized air.

5. The air valve connecting device as claimed in claim 4, wherein said handle includes a first retaining member extended from said handle, and said latch device includes a second retaining member provided therein for engaging with said first retaining member of said handle and for anchoring said detent in engagement with said casing.

6. The air valve connecting device as claimed in claim 5, wherein said first retaining member of said handle is selected from a tongue extended from said handle, and said second retaining member of said latch device is selected from an aperture formed in said latch device.

7. The air valve connecting device as claimed in claim 1, wherein said casing members of said casing each include a resilient outer peripheral wall for increasing a resilience of said casing members of said casing.

8. The air valve connecting device as claimed in claim 1, wherein said sliding member includes a tube provided in said lower portion of said sliding member and engaged into said passage of said casing for anchoring said casing to said sliding member.

9. The air valve connecting device as claimed in claim 1, wherein said housing includes a spring biasing member disposed in said compartment of said housing and engaged between said sliding member and said housing for biasing and moving said sliding member toward said lower portion of said housing.

10. The air valve connecting device as claimed in claim 1, wherein said housing includes a positioning device engaged into said lower portion of said compartment of said housing and engageable with said casing members of said casing for preventing said casing from being disengaged from said housing inadvertently.

11. The air valve connecting device as claimed in claim 10, wherein said housing includes a channel formed in said lower portion of said housing and communicating with said compartment of said housing for engaging with said positioning device.

12. The air valve connecting device as claimed in claim 10, wherein said positioning device includes an orifice formed therein and communicating with said compartment of said housing for receiving and engaging with said inflation valve.

13. An air valve connecting device comprising:
   a housing including a compartment formed therein, and including an entrance formed therein and communicating with said compartment of said housing for receiving a pressurized air, and including a inner peripheral surface formed in a lower portion of said housing,
   a sliding member slidably received and engaged in said compartment of said housing, and including a pathway formed therein and communicating with said entrance of said housing for receiving the pressurized air from said entrance of said housing, said sliding member including a lower portion,
   a gripping device including a casing having two casing members slidably engaged with said inner peripheral surface in said lower portion of said housing, said casing including a passage formed in said casing members,
   an inflation valve engageable into said passage of said casing members of said casing for selectively moving said casing into said compartment of said housing and for allowing said casing members of said casing to be forced toward each other with said inner peripheral surface of said housing, and
   a latch device including a first end portion pivotally attached to said housing with a pivot pin, and including a detent for engaging with said casing and for anchoring and securing said casing to said housing and for retaining said inflation valve in said casing members of said casing, wherein
   one of said casing members includes a notch formed therein for selectively engaging with said detent of said latch device.

14. An air valve connecting device comprising:
   a housing including a compartment formed therein, and including an entrance formed therein and communicating with said compartment of said housing for receiving a pressurized air, and including a inner peripheral surface formed in a lower portion of said housing,
   a sliding member slidably received and engaged in said compartment of said housing, and including a pathway formed therein and communicating with said entrance of said housing for receiving the pressurized air from said entrance of said housing, said sliding member including a lower portion, a gripping device including a casing having two casing members slidably engaged with said inner peripheral surface in said lower portion of said housing, said casing including a passage formed in said casing members, said sliding member including a tube provided in said lower portion of said sliding member and engaged into said passage of said casing for anchoring said casing to said sliding member, a sealing ring engaged between said tube of said sliding member and said casing, and an inflation valve engageable into said passage of said casing members of said casing for selectively moving said casing into said compartment of said housing and for allowing said casing members of said casing to be forced toward each other with said inner peripheral surface of said housing.

* * * * *